United States Patent
West et al.

(10) Patent No.: US 8,864,141 B2
(45) Date of Patent: Oct. 21, 2014

(54) BLADE SEAL

(75) Inventors: Colin John West, Bristol (GB); David Alistair Sutton, Bristol (GB)

(73) Assignee: Airbus Operations Limited, Bristol (GB)

( * ) Notice: Subject to any disclaimer, the term of this patent is extended or adjusted under 35 U.S.C. 154(b) by 1332 days.

(21) Appl. No.: 12/349,116

(22) Filed: Jan. 6, 2009

(65) Prior Publication Data
US 2009/0184477 A1 Jul. 23, 2009

(30) Foreign Application Priority Data

Jan. 17, 2008 (GB) .................................. 0800757.7

(51) Int. Cl.
| | |
|---|---|
| F16J 15/08 | (2006.01) |
| F16J 15/10 | (2006.01) |
| B29C 43/14 | (2006.01) |
| B29C 43/20 | (2006.01) |
| B29C 43/00 | (2006.01) |
| B29C 43/52 | (2006.01) |
| B29K 307/00 | (2006.01) |
| B29K 105/00 | (2006.01) |
| B29C 65/00 | (2006.01) |
| B29C 43/36 | (2006.01) |
| B29K 21/00 | (2006.01) |
| B29K 83/00 | (2006.01) |
| B29C 35/02 | (2006.01) |
| B29K 105/24 | (2006.01) |
| B29K 27/12 | (2006.01) |

(52) U.S. Cl.
CPC ....... *F16J 15/104* (2013.01); *F05C 2203/0808* (2013.01); *B29C 43/146* (2013.01); *B29C 43/52* (2013.01); *B29K 2307/00* (2013.01); *B29K 2995/0005* (2013.01); *B29K 2105/0023* (2013.01); *B29C 43/203* (2013.01); *B29C 66/7375* (2013.01); *B29C 43/003* (2013.01); *F05C 2225/02* (2013.01); *B29C 2043/3634* (2013.01); *B29K 2305/14* (2013.01); *B29K 2021/00* (2013.01); *B29K 2083/00* (2013.01); *B29C 35/02* (2013.01); *B29C 2043/148* (2013.01); *B29K 2105/246* (2013.01); *F05C 2201/0421* (2013.01); *B29K 2027/12* (2013.01)
USPC .......................................................... 277/650

(58) Field of Classification Search
USPC .......................................... 277/650, 651, 922
See application file for complete search history.

(56) References Cited

U.S. PATENT DOCUMENTS 4,900,877 A 2/1990 Dubrow et al.
4,968,854 A * 11/1990 Benn et al. ..................... 174/354
(Continued)

FOREIGN PATENT DOCUMENTS

| EP | 1094257 A2 | 4/2001 |
|---|---|---|
| GB | 10340802 A1 | 4/2005 |
| WO | 9428337 A1 | 12/1994 |

OTHER PUBLICATIONS

UK Search Report for GB0800757.7 dated May 12, 2008.

*Primary Examiner* — Gilbert Lee
(74) *Attorney, Agent, or Firm* — Lowe Hauptman & Ham, LLP

(57) ABSTRACT

A blade seal comprising: a base; a tip; a first part formed from an elastomeric material which extends continuously from the base to the tip; and a second part formed from an elastomeric material mixed with conductive filler which extends continuously from the base to the tip. The blade seal is manufactured by compressing the first and second parts together; and curing one or both of the parts as they are compressed together.

11 Claims, 4 Drawing Sheets

(56) References Cited

U.S. PATENT DOCUMENTS 5,115,104 A * 5/1992 Bunyan .................. 174/356

8,312,805 B1 * 11/2012 Blume ........................ 92/240
2002/0056789 A1 5/2002 Jones
2008/0078880 A1 4/2008 Petit

* cited by examiner

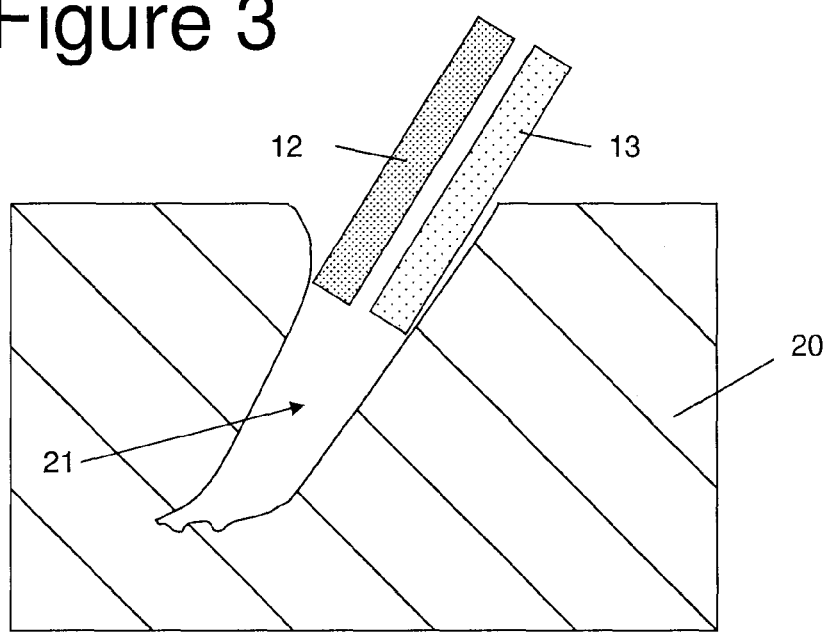
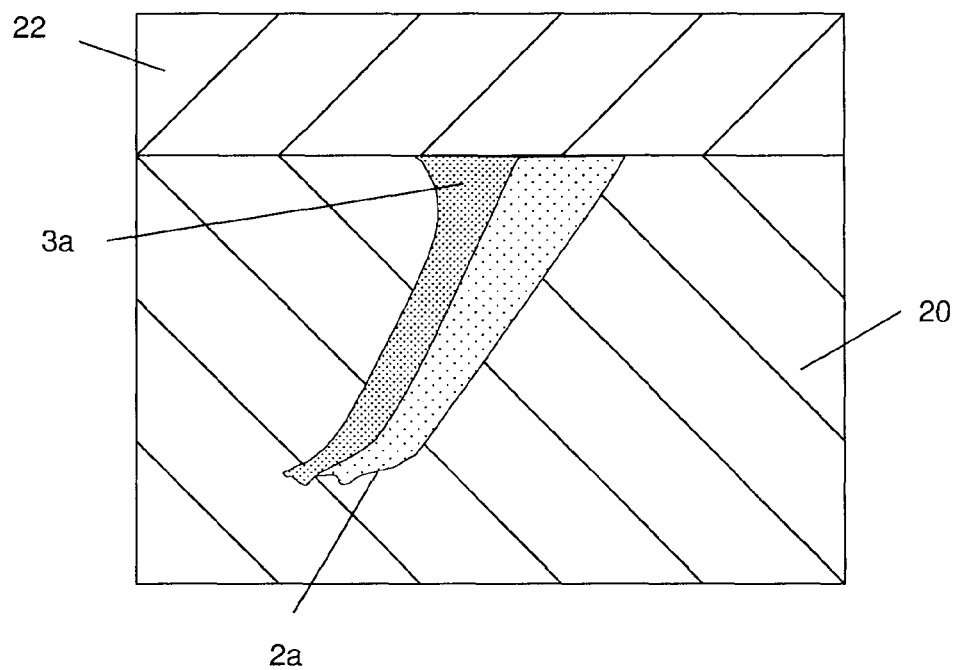

// BLADE SEAL

RELATED APPLICATIONS

The present application is based on, and claims priority from, British Application Number 0800757.7, filed Jan. 17, 2008, the disclosure of which is hereby incorporated by reference herein in its entirety.

FIELD OF THE INVENTION

The present invention relates to a blade seal.

BACKGROUND OF THE INVENTION

WO 94/28377 describes a conductive sealing gasket incorporating one or more layers of electrically conductive mesh embedded into a fluorelastomer. The fluoroelastomer may contain conductive filler, although this is not preferred, nor typically necessary. The arrangement of WO 94/28377 suffers from a number of problems. Firstly, the mesh is liable to scratch the substrate that the gasket seals against. Secondly, the mesh is liable to corrode easily. Thirdly, it may be difficult to ensure a secure electrical connection because the inner conductive area is recessed behind the outer non-conductive sealing area.

SUMMARY OF THE INVENTION

A first aspect of the invention provides a blade seal comprising: a base; a tip; a first part formed from an elastomeric material which extends continuously from the base to the tip; and a second part formed from an elastomeric material mixed with conductive filler which extends continuously from the base to the tip.

The invention uses conductive filler to provide the conductive path across the seal, instead of a mesh of the kind described in WO 94/28377. Although the conductivity may be relatively low compared with the mesh of WO 94/28377, it may be sufficiently high for certain applications. Furthermore, the conductive filler is less susceptible to corrosion than the mesh of WO 94/28377, and less likely to scratch the substrate that the sealing member seals against.

The first and second parts may be formed from the same elastomeric material, but more preferably they are formed from different elastomeric materials. In this case the elastomeric material forming the first part may have a higher degree of fuel resistance than the elastomeric material forming the second part.

The sealing member may be provided on an aircraft or in any other suitable application.

A second aspect of the invention provides a joint comprising first and second components; and the blade seal of the first aspect of the invention with its base attached to the first component and its tip forming a seal with the second component. The first part of the blade seal engages the second component at the tip of the blade seal to form an environmental seal with the second component and the second part of the blade seal engages the second component at the tip of the blade seal to form an electrical connection with the second component.

A further aspect of the invention provides a method of manufacturing the blade seal of the first aspect of the invention, the method comprising compressing the first and second parts together; and curing one or both of the parts as they are compressed together.

Various preferred features of the invention are set out in the dependent claims.

BRIEF DESCRIPTION OF THE DRAWINGS

Embodiments of the invention will now be described with reference to the accompanying drawings, in which:

FIGS. 3 and 4 show two steps in a first method of manufacturing a sealing member;

DETAILED DESCRIPTION OF EMBODIMENT(S)

Figure 1:
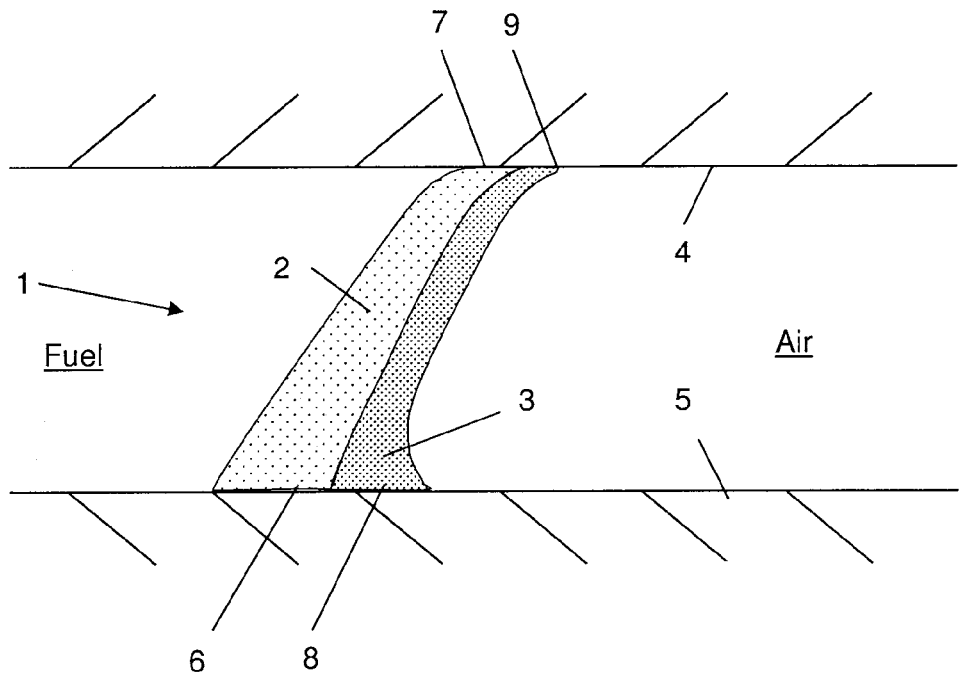
FIG. 1 is a cross-sectional view of a blade seal according to a first embodiment of the invention.

A blade seal 1 shown in FIG. 1 comprises a first part 2 formed from a non-conductive elastomeric material; and a second part 3 formed from a conductive elastomeric material.

Each part of the blade seal 1 has a base 6,8 attached to a first component 5 and a tip 7,9 forming a seal with a second component 4. The first (non-conductive) part 2 extends continuously from the base to the tip of the blade seal and provides an external surface on the left-hand side of the blade seal. In the example of FIG. 1 the seal 1 provides an environmental seal between fuel on the left-hand side of the seal, and air on its right-hand side.

Preferably the pressure on the right-hand side of the seal exceeds the pressure on the left-hand side so that the pressure differential acts to press the tips 7,9 against the second component 4. If the pressure differential acts in the opposite direction then the seal is preferably a mirror-image of the seal shown in FIG. 1, so the pressure enhances the sealing action in the same way.

The second (conductive) part 3 extends continuously from the base to the tip of the blade seal and provides an external surface on the right-hand side of the blade seal. The second (conductive) part forms a continuous conductive path between the components 4,5.

The material forming the non-conductive part 2 of the seal 1 is selected to optimise its ability to form a tight environmental seal against the component 4, and to provide a high degree of fuel resistance. A fluorosilicone such as ABR 4-0090 or ABR 4-0080 is suitable.

The material forming the conductive part 3 of the seal 1 is selected to optimise its electrical conductivity. A fluorosilicone mixed with silver or carbon filler particles (either in the form of carbon black or carbon nanotubes) is suitable. This electrical conductivity can be used to form a current path between the components 4,5 in the event of a lightning strike, to prevent the build-up of static electricity between the components, and/or to transmit data between the components.

Because the part 3 has no metallic mesh, the path of highest conductivity across the sealing member is provided by the conductive filler particles mixed within the part 3. As a result the conductivity of the part 3 may be relatively low compared with the mesh of WO 94/28377, but it has been a surprising discovery that for static electricity protection purposes a relatively moderate electrical resistance is desirable. In other words, if a mesh was used to increase the conductivity then the conductivity may be too high and may cause sparking.

Figure 2:
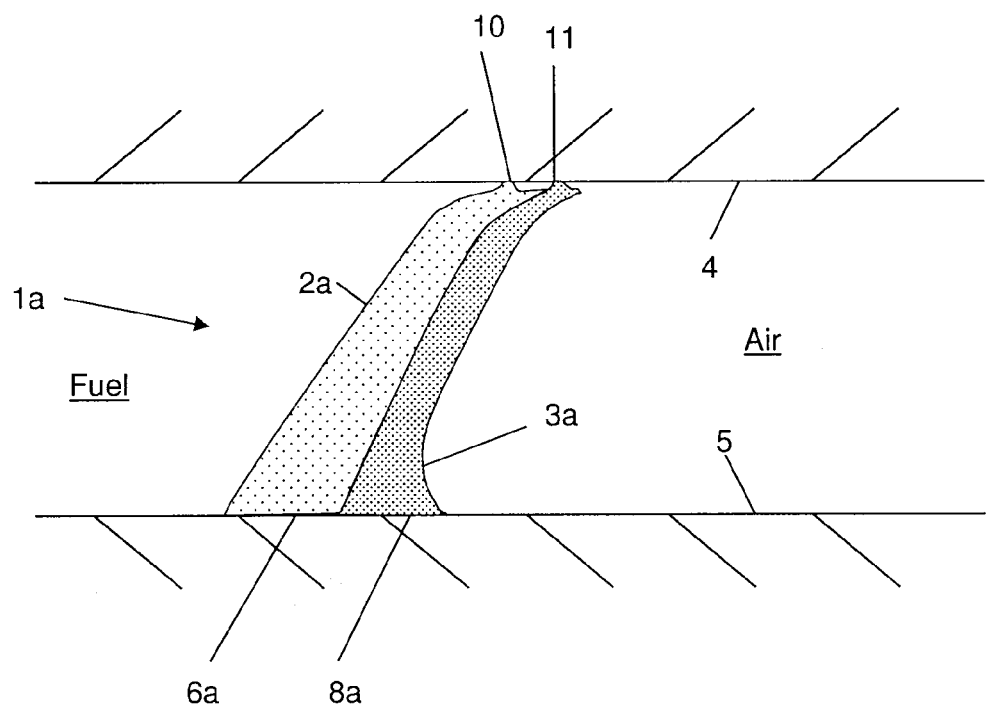
FIG. 2 is a cross-sectional view of a blade seal according to a second embodiment of the invention.

In the alternative blade seal 1a shown in FIG. 2 the tip of the blade seal comprises a first projection 10 formed from the first (non-conductive) elastomeric material and a second projection 11 formed from the second (conductive) elastomeric material. The projection 10 ensures a secure environmental seal with the component 4 and the projection 11 ensures a secure electrical connection with the component 4.

Various methods of moulding and bonding together the parts 2a,3a of the seal 1a are shown in FIGS. 3-8. The seal 1 may be manufactured in a similar way.

In the method shown in FIGS. 3 and 4, two charges 12,13 of uncured elastomeric material are placed together in a mould cavity 21 of a mould tool 20. The charges are then compressed and heated together within the mould cavity by a tool 22 to form and co-cure the parts 2a,3a. Optionally a fabric reinforcement layer may also be placed in the mould cavity between the charges 12,13 and/or integrated into the charges 12,13.

Figure 5:
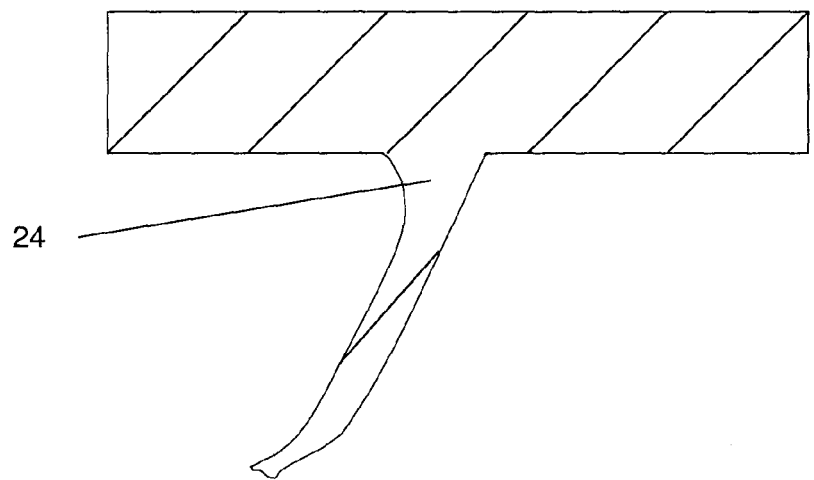
FIG. 5 shows a male mould tool.
Figure 6:
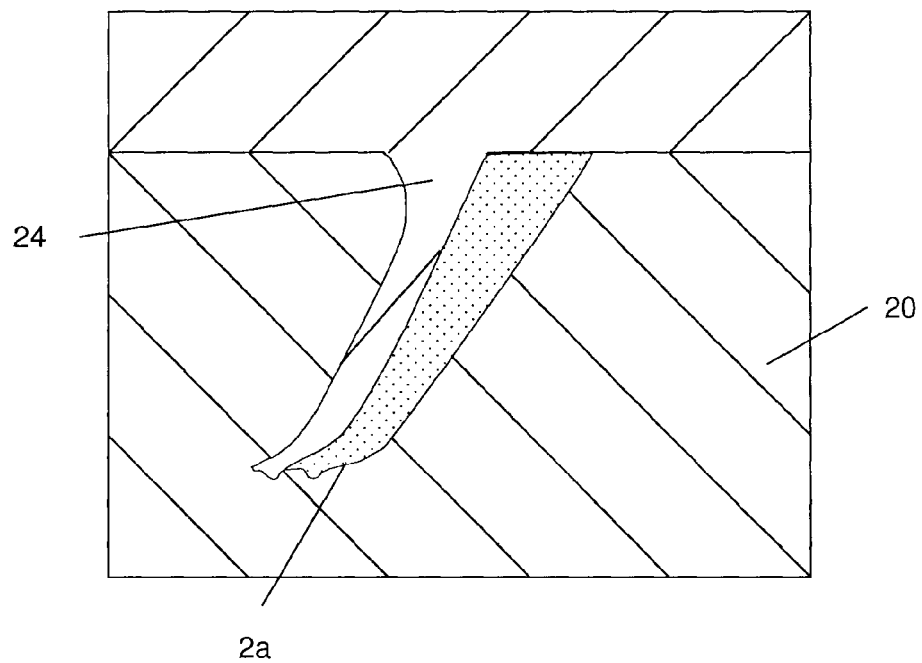
FIG. 6 shows the male mould tool being used in a second method of manufacturing a sealing member.

In the method shown in FIGS. 5 and 6, the charge 13 of uncured elastomeric material is first placed in the mould cavity 21. A male mould tool 24 is then inserted into the mould cavity as shown in FIG. 6 and the charge 13 is compressed and heated to produce a moulded and cured part 2a. The male mould tool 24 is then removed from the mould cavity 21 and the other charge 12 of uncured material is placed in the vacated space of the mould cavity next to the moulded and cured part 2a. The charge 12 is then heated, and compressed against the part 2a within the mould cavity 21 (FIG. 3) by the tool 22 to form and cure the part 3a.

Figure 7:
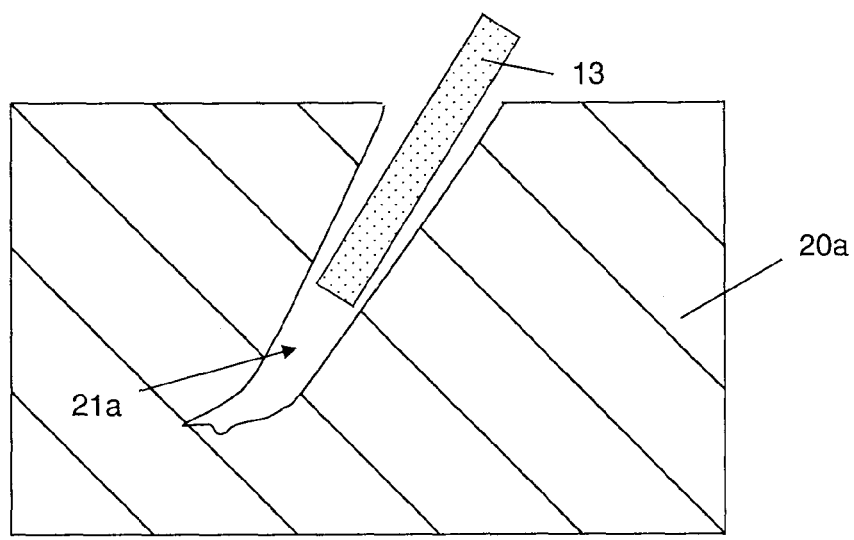
FIGS. 7 and 8 show two steps in a third method of manufacturing a sealing member.
Figure 8:
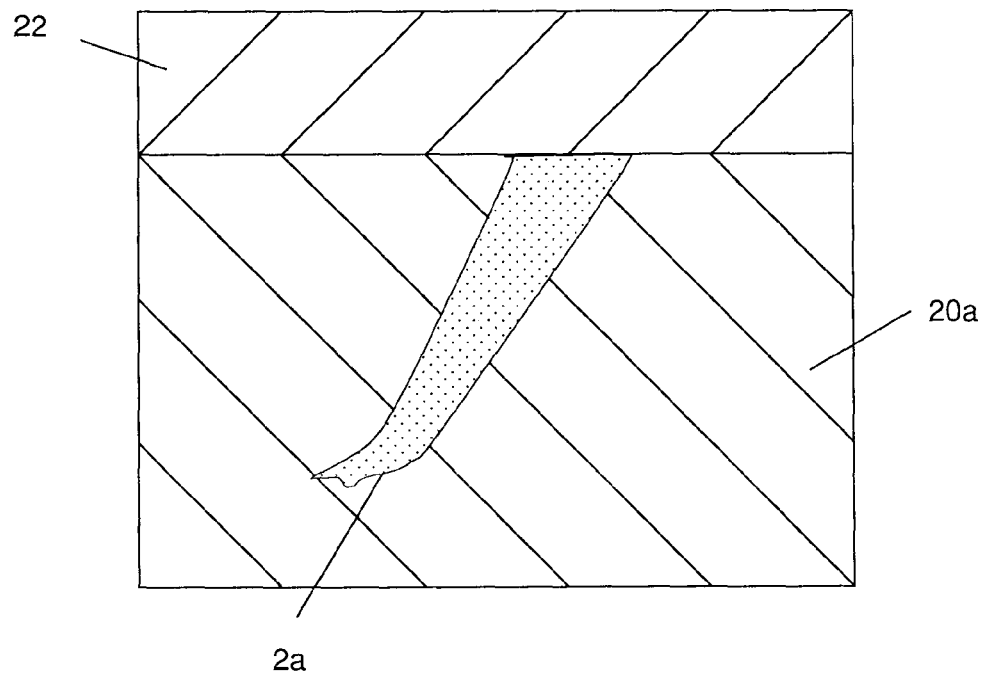

In the method shown in FIGS. 7 and 8, the charge 13 of uncured elastomeric material is placed in a mould cavity 21a and moulded and cured to produce a moulded cured part 2a as shown in FIG. 8. The moulded cured part 2a is then removed from the mould cavity 21a and placed in the mould cavity 21 (FIG. 3) together with the other charge 12 of uncured material. The charge 12 is then heated, and compressed against the part 2a within the mould cavity 21 by the tool 22 to form and cure the part 3a.

Although the invention has been described above with reference to one or more preferred embodiments, it will be appreciated that various changes or modifications may be made without departing from the scope of the invention as defined in the appended claims.

The invention claimed is:

1. A blade seal comprising:
a base;
a tip;
a first part formed from a non-conductive material, wherein said non-conductive material is elastomeric which extends continuously from the base to the tip;
a second part formed from a conductive material, wherein said conductive material is elastomeric mixed with conductive filler which extends continuously from the base to the tip;
wherein a path of highest conductivity across the sealing member is provided by the conductive filler within the second part and not the first part; and,
wherein the first part is arranged to engage a component at the tip of the blade seal to form an environmental seal with the component, and the second part is arranged to engage the component at the tip of the blade seal to form an electrical connection with the component.

2. The blade seal of claim 1 wherein the filler comprises silver or carbon.

3. The blade seal of claim 1 wherein the second part comprises a projection for forming the electrical connection with the component.

4. The blade seal of claim 1 wherein the first and second parts are formed from different elastomeric materials.

5. The blade seal of claim 4 wherein the elastomeric material forming the first part has a higher degree of fuel resistance than the elastomeric material forming the second part.

6. The blade seal of claim 1 wherein the first part provides an external surface on a first side of the blade seal; and the second part provides an external surface on a second side of the blade seal.

7. The blade seal of claim 1 wherein the first and second parts are bonded together.

8. A joint comprising first and second components; and the blade seal of claim 1 with the base of the blade seal attached to the first component and the tip of the blade seal forming a seal with the second component, wherein the first part of the blade seal engages the second component at the tip of the blade seal to form an environmental seal with the second component and the second part of the blade seal engages the second component at the tip of the blade seal to form an electrical connection with the second component.

9. An aircraft comprising the joint of claim 8.

10. A blade seal comprising:
a base;
a tip;
a first part formed from a non-conductive material, wherein said non-conductive material is an elastomeric material which extends continuously from the base to the tip;
a second part formed from a conductive material, wherein said conductive material is elastomeric mixed with conductive filler which extends continuously from the base to the tip;
wherein the first part as a whole is less conductive than the second part as a whole; and,
wherein the first part is arranged to engage a component at the tip of the blade seal to form an environmental seal with the component, and the second part is arranged to engage the component at the tip of the blade seal to form an electrical connection with the component.

11. A joint comprising first and second components; and the blade seal of claim 10 with the base of the blade seal attached to the first component and the tip of the blade seal forming a seal with the second component, wherein the first part of the blade seal engages the second component at the tip of the blade seal to form an environmental seal with the second component and the second part of the blade seal engages the second component at the tip of the blade seal to form an electrical connection with the second component.

* * * * *